(12) United States Patent
Lin et al.

(10) Patent No.: US 11,914,541 B2
(45) Date of Patent: Feb. 27, 2024

(54) CONTROL OF DEVICE FEATURES BASED ON SLOT CONFIGURATIONS

(71) Applicant: HEWLETT-PACKARD DEVELOPMENT COMPANY, L.P., Spring, TX (US)

(72) Inventors: Wen Bin Lin, Taipei (TW); ChiWei Ding, Taipei (TW); Chun Yi Liu, Taipei (TW); Shuo-Cheng Cheng, Taipei (TW); Chao-Wen Cheng, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 102 days.

(21) Appl. No.: 17/707,112

(22) Filed: Mar. 29, 2022

(65) Prior Publication Data
US 2023/0315667 A1 Oct. 5, 2023

(51) Int. Cl.
*G06F 13/00* (2006.01)
*G06F 13/40* (2006.01)
*G06F 1/3215* (2019.01)
*G06F 13/42* (2006.01)

(52) U.S. Cl.
CPC ........ *G06F 13/4081* (2013.01); *G06F 1/3215* (2013.01); *G06F 13/4221* (2013.01); *G06F 2213/0026* (2013.01)

(58) Field of Classification Search
CPC ............... G06F 13/4081; G06F 1/3215; G06F 13/4221; G06F 2213/0026
See application file for complete search history.

(56) References Cited

U.S. PATENT DOCUMENTS

| 5,375,218 A | * | 12/1994 | Umeda ............... G06F 13/28 710/22 |
| 6,504,534 B1 | * | 1/2003 | Takase ............... G06F 1/3218 348/730 |
| 9,374,786 B1 | * | 6/2016 | Maheshwari ..... H04W 52/0251 |
| 2005/0102463 A1 | * | 5/2005 | Peil ................... G06F 13/4027 710/316 |
| 2021/0026428 A1 | * | 1/2021 | Olarig ............... G06F 1/3228 |
| 2022/0391003 A1 | * | 12/2022 | Rajagopal ......... G06F 1/3231 |

* cited by examiner

*Primary Examiner* — Henry Tsai
*Assistant Examiner* — Kim T Huynh
(74) *Attorney, Agent, or Firm* — Knobbe, Martens, Olson & Bear, LLP

(57) ABSTRACT

In example implementations, a computing device is provided. The computing device includes an expansion interface, a first device, a second device, and a processor communicatively coupled to the expansion interface. The expansion interface includes a plurality of slots. Two slots of the plurality of slots are controlled by a single reset signal. The first device is connected to a first slot of the two slots and has a feature that is compatible with the single reset signal. The second device is connected to a second slot of the two slots and does not have the feature compatible with the single reset signal. The process is to detect the first device connected to the first slot and the second device connected to the second slot and disable the feature by preventing the first slot and the second slot from receiving the single reset signal.

20 Claims, 5 Drawing Sheets

US 11,914,541 B2

CONTROL OF DEVICE FEATURES BASED ON SLOT CONFIGURATIONS

BACKGROUND

Computing devices can be used to execute various applications and programs. A processor is deployed in a computing device to execute the applications and programs. The computing device can have additional components that can help execute the applications, such as memory, graphics processors, and the like.

The computing device may include various interfaces and buses with slots to connect external devices. For example, discrete graphics cards, memory modules, thunderbolt cards, and the like, may be connected to the slots in the various interfaces or buses of the computing device to expand the functionality or capabilities of the computing devices.

DETAILED DESCRIPTION

Figure 1:
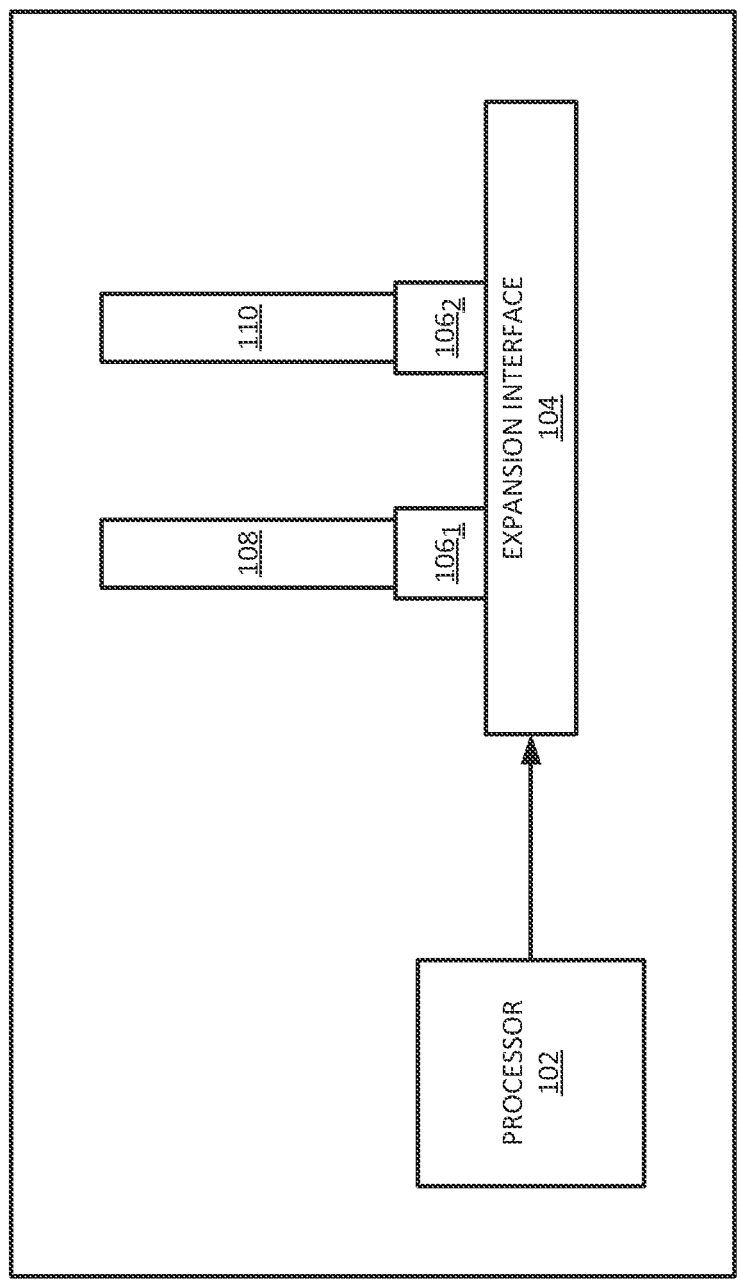
FIG. 1 is a block diagram of an example computing device to control a feature of a device based on slot configurations of the present disclosure.

Examples described herein provide a computing device and method to control a feature of a device based on slot configurations. As discussed above, computing devices may include various interfaces and buses with slots to connect external devices. For example, discrete graphics cards, memory modules, thunderbolt cards, non-volatile memory express (NVMe) cards, a networking card (e.g., a local area network (LAN) card), and the like, may be connected to the slots in the various interfaces or buses of the computing device to expand the functionality or capabilities of the computing device.

Some slots on the expansion interface may be controlled by separate reset signals. However, some slots may be controlled as a group with a single reset signal. In other words, a single reset signal may control the group of slots.

Some interfaces may allow external devices that have power savings capabilities to be connected to a slot on an expansion interface. When the power saving capability is initiated, the controller of the expansion interface may send a reset signal to enter the external device into a power savings mode. An example of the power savings feature may include runtime D3 (RTD3) that can be found on thunderbolt cards. A reset signal may be generated to enable and disable the RTD3 power savings mode for a thunderbolt card.

If the external device is connected to a slot that is controlled independently by a dedicated reset signal, then the external device may enter the power savings mode correctly. However, if the external device (e.g., the thunderbolt card) is connected to a slot that shares a reset signal with another slot on the expansion interface, then the reset signal may cause an error on another external device (e.g., a graphics card) connected to the other slot that shares the reset signal.

To illustrate, a first slot and a second slot of an expansion interface may share a reset signal. A first electronic device with power savings capabilities may be connected to the first slot. A second electronic device may be connected to the second slot. The first electronic device may enter a power savings mode causing a controller of the expansion interface to generate a reset signal for the first slot and the second slot. The reset signal may unintentionally cause an error in the connection of the second electronic device connected to the second slot. The error in the second electronic device may cause a malfunction in the operation of the computing device or an application that is executed on the computing device.

The present disclosure provides controls for the reset signals based on slot configurations of an expansion interface. For example, the basic input/output system (BIOS) may be modified to detect if slots that share a reset signal are connected to a first device that is compatible with a reset signal and a second device that is incompatible with the reset signal. If such a configuration of the slots of the expansion interface is detected, then the BIOS may temporarily disable a feature of the first device (e.g., a power savings mode that can cause the reset signal to be generated). The feature may be disabled until the second device is removed or the first device is moved to a different slot that is associated with a dedicated reset signal.

Thus, the computing device of the present disclosure may ensure proper operation of different devices connected to the slots of an expansion interface. The proper operation of the different devices may be achieved without any hardware changes.

FIG. 1 illustrates an example computing device 100 of the present disclosure. In an example, the computing device 100 may include a processor 102 and an expansion interface 104. The processor 102 may be communicatively coupled to the expansion interface 104 and control operation of the expansion interface 104.

The expansion interface 104 may include a plurality of slots $106_1$ and $106_2$. Although two slots $106_1$ and $106_2$ are illustrated in FIG. 1, it should be noted that the expansion interface 104 may include any number of slots.

The expansion interface 104 may allow additional devices to be connected to the computing device 100. The expansion interface 104 may allow easy plug-and-play connections for the devices to quickly add expanded functionality to the computing device 100.

In an example, the slots $106_1$ and $106_2$ may share a reset signal. The reset signal may be generated to activate various features that may be available on devices connected to the expansion interface 104. The features may include a power savings mode (e.g., RTD3 for a thunderbolt device). When the power savings mode is activated on a device connected to one of the slots $106_1$ or $106_2$, the expansion interface 104 may generate and transmit the reset signal to the slots $106_1$ and $106_2$. The reset signal may allow the device to activate the power savings mode to reduce power consumption when not in use.

In an example, a first device 108 may be connected to the slot $106_1$ and a second device 110 may be connected to the slot $106_2$. The first device 108 may be a thunderbolt device that has a feature that is compatible with the shared reset signal. For example, the first device 108 may be a thunderbolt device that has a power savings feature (e.g., RTD3).

When the first device 108 is not in use, the first device 108 may go into a power saving mode that causes the expansion interface 104 to generate a reset signal again. The reset signal may temporarily reduce power on the slots $106_1$ and $106_2$ until the first device 108 exits the power savings mode.

In an example, the second device 110 may be a non-thunderbolt device. For example, the second device 110 may be a device that does not include the feature that is compatible with the reset signal. In other words, the second device 110 does not use the same reset signal used by the first device 108. The second device 110 may be a discrete graphics card, a network interface card, and the like.

However, as noted above, the second device 110 may not include the feature that is compatible with, or uses, the reset signal. Thus, if the reset signal is generated and/or sent while the second device 110 is connected to one of the slots $106_1$ or $106_2$, the connection to the second device 110 may be lost. This may cause the device to malfunction or cause an error on the computing device 100. For example, if the second device 110 were a graphics card and the connection is lost, any applications using the graphics card to process graphics information may malfunction or generate errors. This may lead to an undesirable user experience on the computing device 100.

The present disclosure may disable the feature (e.g., a power savings feature) of the first device 108 when a mixed configuration is detected on the slots $106_1$ and $106_2$. For example, if a thunderbolt device is detected on the slot $106_1$ and a non-thunderbolt device is detected in the slot $106_2$, the processor may detect the mixed configuration and disable the feature on the expansion interface 104. As a result, while the first device 108 and the second device 110 are connected to the slots $106_1$ and $106_2$, respectively, the expansion interface 104 may be prevented from generating and transmitting the reset signal that enables the feature. In other words, if the first device 108 attempts to activate the feature associated with the reset signal (e.g., a power savings mode feature), the expansion interface 104 may be prevented from transmitting the reset signal to the slots $106_1$ and $106_2$.

It should be noted that the computing device 100 illustrated in FIG. 1 has been simplified for ease of explanation. The computing device 100 may include additional components that are not shown. For example, the computing device 100 may include input/output devices (e.g., a monitor, a display, a touch screen display, a keyboard, a mouse, a track pad, and the like), a power supply (e.g., a power adapter, a battery pack, and the like), a hard disk drive, a solid state drive, a graphics processor, one or more interfaces, a wired or wireless communication interface, and the like.

Figure 2:
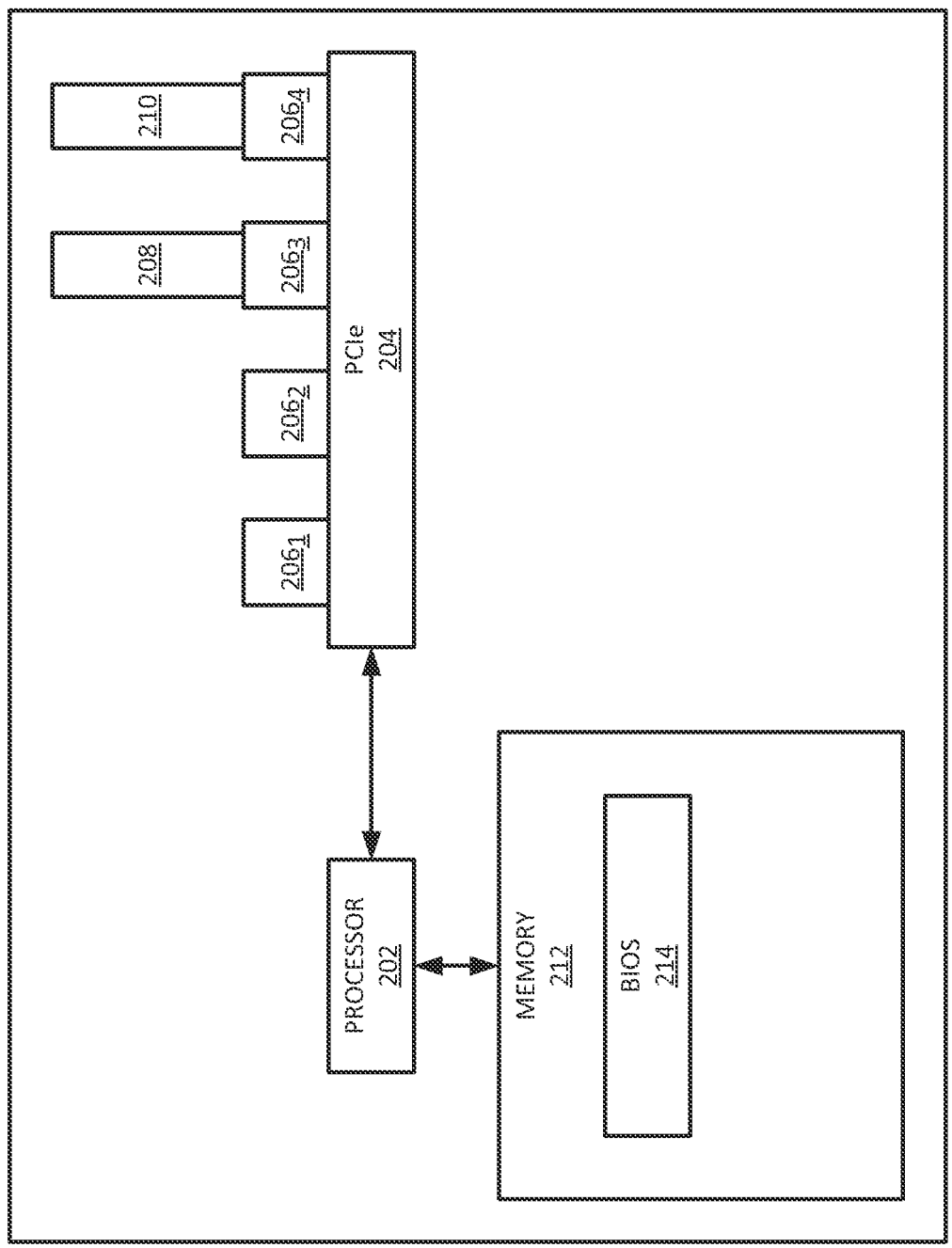
FIG. 2 is another block diagram of an expansion interface of the present disclosure.

FIG. 2 illustrates an example computing device 200 of the present disclosure. FIG. 2 illustrates the computing device 200 with a particular example of the expansion interface 104. For example, the computing device 200 may include a processor 202, a peripheral component interconnect express (PCIe) interface 204, and a memory 212. The processor 202 may be communicatively coupled to the PCIe interface 204 and the memory 212. The processor 202 may control operation of the PCIe interface 204. The processor 202 may also execute instructions or applications stored in the memory 212 to perform the functions described herein.

In an example, the PCIe interface 204 may include slots $206_1$ to $206_4$. In an example, a first pair of slots $206_1$ and $206_2$ may be independently controlled by respective independent reset signals. For example, the PCIe interface 204 may transmit a reset signal to the slot $206_1$ to control a device connected to the slot $206_1$. The PCIe interface 204 may also send a separate reset signal to the slot $206_2$ to control a device connected to the slot $206_2$.

Another pair of slots $206_3$ and $206_4$ may be controlled together by a shared reset signal. In other words, a single reset signal may be transmitted to the slots $206_3$ and $206_4$. Said another way, generating and/or sending the shared reset signal to the slot $206_3$ may also cause the slot $206_4$ to receive the shared reset signal.

In an example, the memory 212 may be any type of non-transitory computer readable medium. The memory 212 may be a hard disk drive, a solid state drive, a random access memory (RAM), a read-only memory (ROM), and the like. The memory 212 may store instructions that are executed by the processor 202 to perform the functions described herein.

In an example, the memory 212 may store a basic input/output system (BIOS) 214 that can be controlled or executed by the processor 202. As used herein, a BIOS refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of the computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

In an example, a first device 208 may be connected to the slot $206_3$ and a second device 210 may be connected to the slot $206_4$. The first device 208 may be a thunderbolt device that has a feature that is compatible with the shared reset signal. For example, the first device 208 may be a thunderbolt adapter device that has a power savings feature. When the first device 208 is not in use, the first device 208 may go into a power saving mode that causes the PCIe interface 204 to generate a reset signal. The reset signal may enable the power savings mode to temporarily reduce power on the slots $206_3$ and $206_4$ until the first device 208 exits the power savings mode.

In an example, the second device 210 may be a non-thunderbolt device. For example, the second device 210 may be a device that does not include the feature that is compatible with the reset signal. The second device 210 may be a discrete graphics card, a network interface card, and the like.

However, as noted above, the second device 210 may not include the feature that is compatible with the reset signal. Thus, if the reset signal is generated or sent while the second device 210 is connected to one of the slots $206_3$ or $206_4$, the connection to the second device 210 may be lost. This may cause the device to malfunction or cause an error on the computing device 200. For example, if the second device 210 were a graphics card and the connection is lost, any applications using the graphics card to process graphics information may malfunction or generate errors. This may lead to an undesirable user experience on the computing device 200.

The present disclosure may disable a feature of a device connected to the expansion interface 204 when a mixed configuration is detected on the slots $206_3$ and $206_4$. In an example, the feature may be disabled by the BIOS 214. For example, when the computing device 200 is powered on, the BIOS 214 may scan the slots $206_1$ to $206_4$ to determine if any devices are connected to the slots $206_1$ to $206_4$ as part of a boot sequence before execution of an operating system (OS). If any devices are detected on the slots $206_1$ to $206_4$, the BIOS 214 may identify the devices connected to the slots $206_1$ to $206_4$.

In the example illustrated in FIG. 2, the BIOS 214 may detect that the first device 208 is connected to the slot $206_3$ and that the second device 210 is connected to the slot $206_4$. The BIOS 214 may identify the first device 208 as a thunderbolt device and the BIOS 214 may identify the second device 210 as a non-thunderbolt device. As a result, the BIOS 214 may detect a mixed configuration on the slots $206_3$ and $206_4$ of the PCIe interface 204.

In response, the BIOS 214 may disable the feature that is controlled by the reset signal for the PCIe interface 204. Disabling the feature may prevent the PCIe interface 204 from generating and transmitting the reset signal to the slots $206_3$ and $206_4$ and/or prevent the slots $206_3$ and $206_4$ from receiving the reset signal. In other words, if the first device 208 attempts to activate the feature associated with the reset signal (e.g., a power savings mode feature), the PCIe interface 204 may be prevented from transmitting the reset signal to the slots $206_3$ and $206_4$.

It should be noted that the computing device 200 illustrated in FIG. 2 has been simplified for ease of explanation. The computing device 200 may include additional components that are not shown. For example, the computing device 200 may include input/output devices (e.g., a monitor, a display, a touch screen display, a keyboard, a mouse, a track pad, and the like), a power supply (e.g., a power adapter, a battery pack, and the like), a hard disk drive, a solid state drive, a graphics processor, one or more interfaces, a wired or wireless communication interface, and the like.

Figure 3:
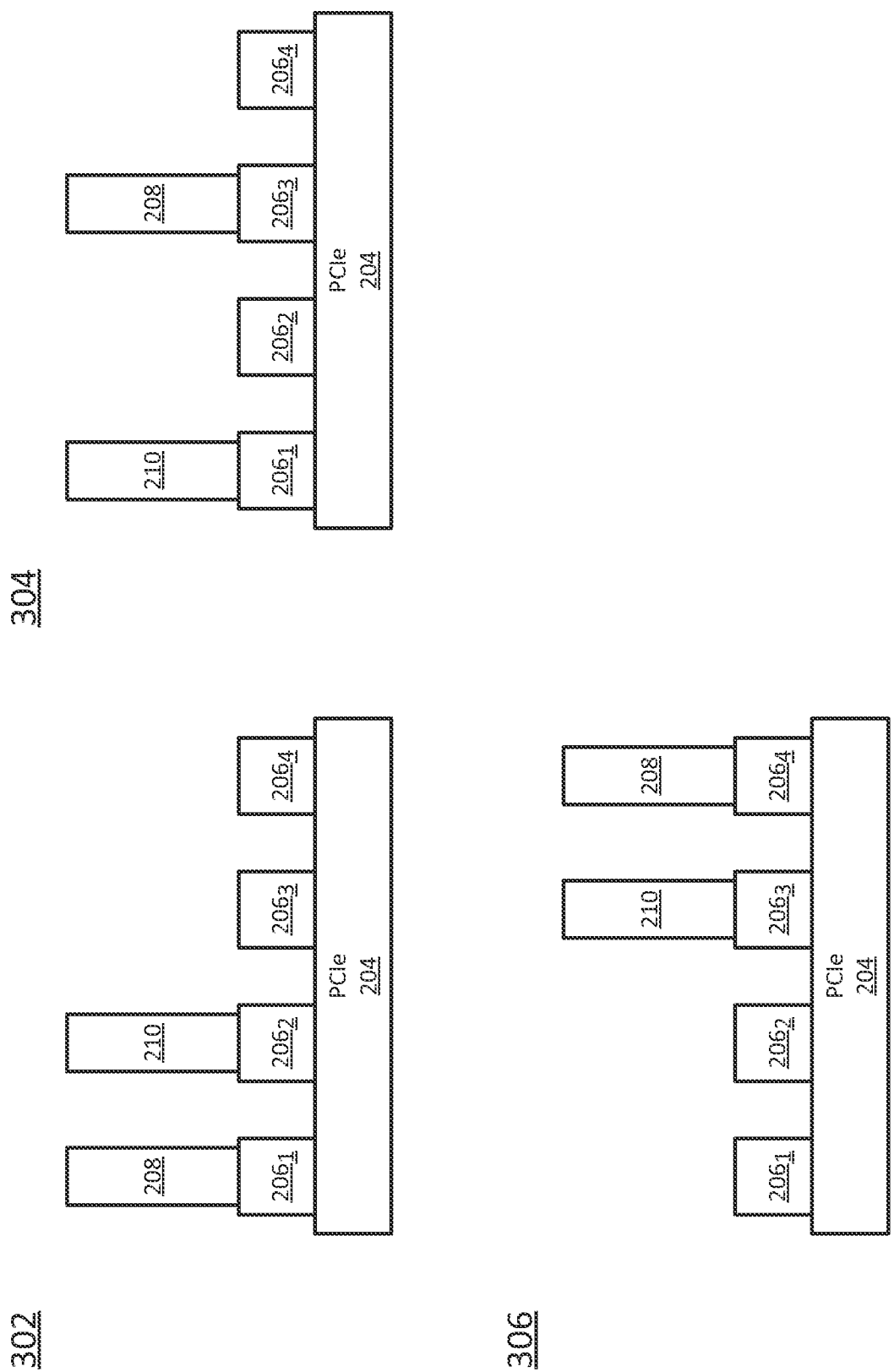
FIG. 3 is a block diagram that illustrates different example configurations of various devices connected to different slots of the expansion interface of the present disclosure.

FIG. 3 illustrates a block diagram of different example configurations of various devices connected to different slots of the PCIe interface 204 of the present disclosure. An example configuration 302 illustrates the first device 208 connected to the slot $206_1$ and the second device 210 connected to the slot $206_2$. As noted above, the slots $206_1$ and $206_2$ may be controlled via separate respective reset signals. As a result, the example configuration 302 may not cause a mixed configuration to be detected and may thus proceed without disabling the feature that is controlled by the reset signal. In other words, generating or sending a reset signal to the slot $206_1$ when the first device 208 goes into a power savings mode may not affect the connection of the second device 210 to the slot $206_2$.

An example configuration 304 illustrates the second device 210 connected to the slot $206_1$ and the first device 208 connected to the slot $206_3$. The example configuration 304 would not cause a mixed configuration to be detected and may thus proceed without disabling the feature controlled by the reset signal. For example, the second device 210 may be unaffected by a reset signal being sent to the slot $206_3$ when the first device 208 goes into a power savings mode.

An example configuration 306 illustrates the second device 210 connected to the slot $206_3$ and the first device 208 connected to the slot $206_4$. The example configuration 306 would cause a mixed configuration to be detected, similar to the mixed configuration illustrated in FIG. 2 and described above. For example, when the first device 208 enters a power savings mode, the PCIe interface 204 may generate and/or send a reset signal to the slot $206_4$. However, as discussed above, the reset signal may be shared with the slot $206_3$. As a result, the reset signal would also be received by the slot $206_3$, causing the connection to the second device 210 to be lost. The disruption to the connection to the second device 210 may cause the second device 210 to malfunction or generate an error, which is undesirable. As a result, the BIOS 214 may disable the feature that is controlled by the reset signal when the mixed configuration example 306 or the mixed configuration illustrated in FIG. 2 is detected.

Figure 4:
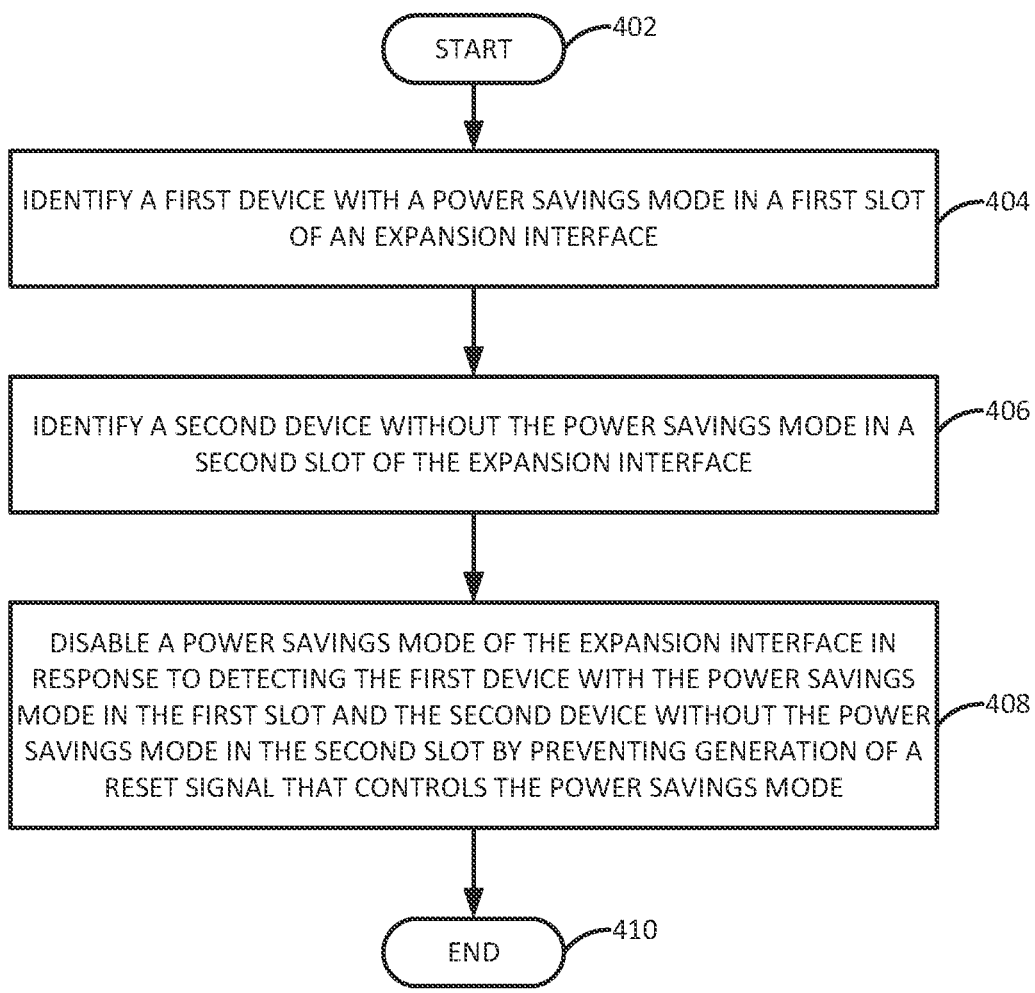
FIG. 4 is a flow chart of an example method to control a feature of a device based on slot configurations of the present disclosure.

FIG. 4 illustrates a flow diagram of an example method 400 for controlling a reset signal based on slot configurations of the present disclosure. In an example, the method 400 may be performed by the computing device 100 illustrated in FIG. 1, the computing device 200 illustrated in FIG. 2, or the apparatus 500 illustrated in FIG. 5, and described below.

At block 402, the method 400 begins. At block 404, the method 400 identifies a first device with a power savings mode in a first slot of an expansion interface. For example, the first device may be a thunderbolt device that has a power savings feature. The power savings feature may be enabled via the BIOS. For example, the BIOS can generate a reset signal that is transmitted to the first slot.

In an example, the expansion interface may be a PCIe interface with four slots. The first pair of slots may be controlled independent of one another. The second pair of slots may be controlled together via a single shared reset signal. In other words, if the shared reset signal is sent to one of the second pair of slots, the other slot of the second pair of slots may also receive the reset signal.

In an example, a BIOS may scan the slots of the expansion interface during a boot sequence when the computing device is powered on. The BIOS may detect which slots are connected to a device and may identify the type of devices connected to the slots.

At block 406, the method 400 identifies a second device without the power savings mode in a second slot of the expansion interface. The second device may be a non-thunderbolt device that does not have the power savings feature. For example, the second device may be a discrete graphics card, a network interface card, and the like.

As noted above, the first slot and the second slot may be controlled together via a single reset signal. In other words, the first slot and the second slot share a reset signal. Sending a reset signal to the first slot may also cause the second slot to receive the reset signal, and vice versa.

At block 408, the method 400 disables a power savings mode of the expansion interface in response to detecting the first device with the power savings mode in the first slot and the second device without the power savings mode in the second slot by preventing generation of a reset signal that controls the power savings mode. For example, the first device that has the power savings mode connected to the first slot and the second device that does not have the power savings mode connected to a second slot may cause a mixed configuration to be detected. As a result, the power savings mode may be disabled.

In an example, the power savings mode may be an RTD3 feature of a thunderbolt device. The power savings mode may be controlled by a reset signal that is generated and transmitted by the BIOS.

In an example, the second device may be removed from the second slot at a later time. The computing device can be restarted and the slots of the expansion interface may be scanned again as part of the boot up sequence. The first device may be identified while still connected to the first slot of the expansion interface. The processor or BIOS may detect that the second slot is now empty as the second device has been removed. The processor or BIOS may enable the power savings mode of the expansion interface in response to detecting that the second slot is empty. In other words, since the second slot is empty, the power savings mode can be re-enabled via the reset signal without causing a loss of connection to any device since the second slot is now empty. At block 410, the method 400 ends.

Figure 5:
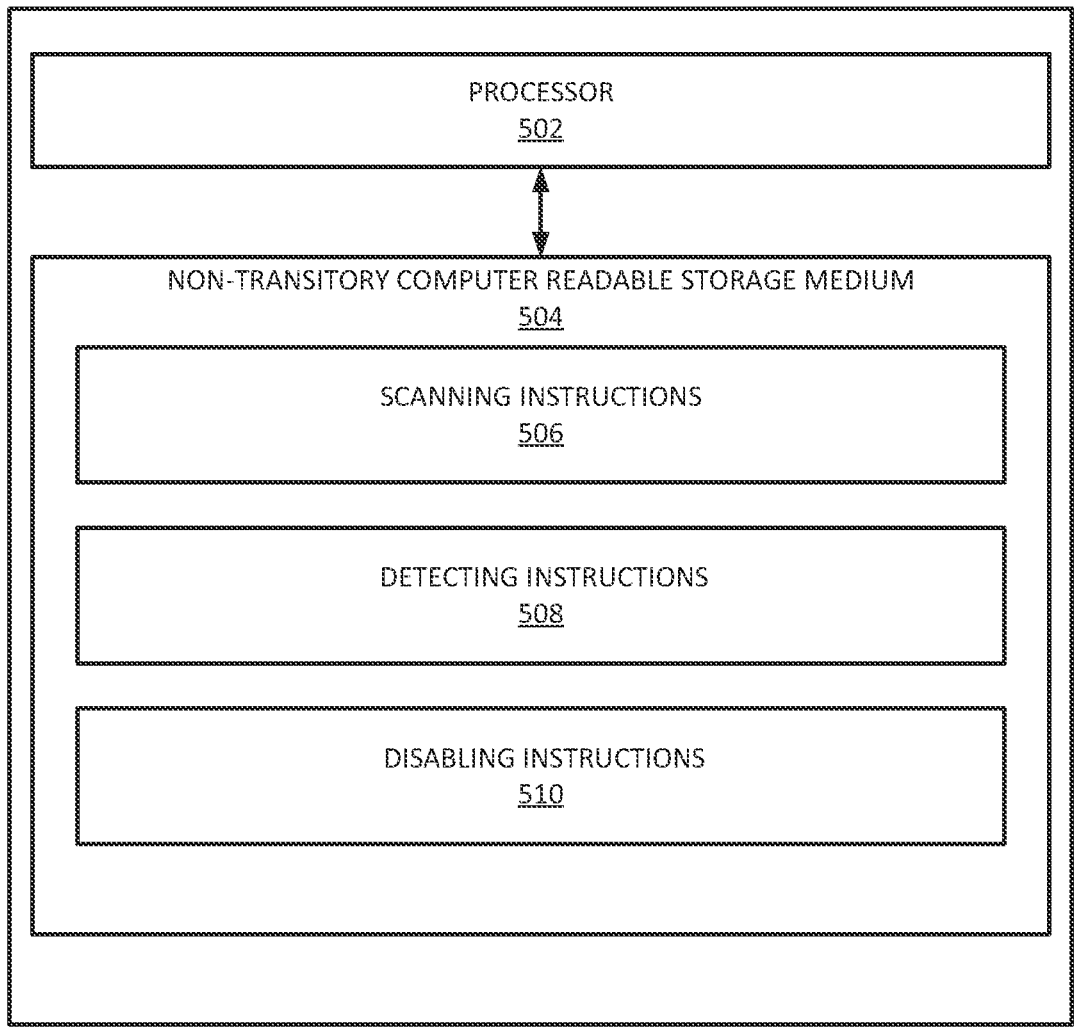
FIG. 5 is an example non-transitory computer readable storage medium storing instructions executed by a processor to control a feature of a device based on slot configurations of the present disclosure.

FIG. 5 illustrates an example of an apparatus 500. In an example, the apparatus 500 may be the apparatus 100 or 200. In an example, the apparatus 500 may include a processor 502 and a non-transitory computer readable storage medium 504. The non-transitory computer readable storage medium 504 may include instructions 506, 508, and 510 that, when executed by the processor 502, cause the processor 502 to perform various functions.

In an example, the instructions 506 may include scanning instructions 506. For example, the instructions 506 may scan a pair of slots of an expansion interface that share a single reset signal. For example, the expansion interface may be a PCIe interface that includes four slots. The PCIe may include two slots that are controlled by respective independent reset signals and two slots that share a single reset signal.

The instructions 508 may include detecting instructions. For example, the instructions 508 may detect a first device with a feature compatible with the single reset signal in a first slot of the pair of slots and a second device that does not include the feature in a second slot of the pair of slots. For example, the first device may be a thunderbolt device that has the feature of a power savings mode (e.g., an RTD3 power savings feature). The second device may not have the power savings mode feature. Thus, if the first device goes into a power savings mode and causes the single reset signal to be sent to the pair of slots, the connection to the second device may be lost. The loss of the connection to the second device may cause the computing device to malfunction.

The instructions 510 may include disabling instructions. For example, the instructions 510 may disable the feature by preventing generation of the single reset signal. To prevent the loss of the connection to the second device, the feature of the first device may be disabled by preventing the generation and/or transmission of the single reset signal. Thus, when the first device goes into the power savings mode feature, the expansion interface may be prevented from transmitting the single reset signal to the pair of slots that could cause the loss of connection to the second device.

In an example, if the second device is removed and the computing device is restarted, the removal of the second device may be detected. Thus, the single reset signal may be re-enabled on the expansion interface and to allow the feature of the first device to function properly.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A computing device, comprising:
an expansion interface comprising a plurality of slots, wherein two slots of the plurality of slots are controlled by a single reset signal;
a first device connected to a first slot of the two slots, wherein the first device has a feature compatible with the single reset signal;
a second device connected to a second slot of the two slots, wherein the second device does not have the feature compatible with the single reset signal; and
a processor communicatively coupled to the expansion interface, wherein the processor is to:
detect the first device connected to the first slot and the second device connected to the second slot;
determine that the first device has the feature compatible with the single reset signal and that the second device does not have the feature compatible with the single reset signal; and
disable the feature by preventing the first slot and the second slot from receiving the single reset signal.

2. The computing device of claim 1, wherein the expansion interface comprises a peripheral component interconnect express (PCIe) interface.

3. The computing device of claim 2, wherein the PCIe interface comprises four slots, wherein the first slot and the second slot are controlled by the single reset signal and a third slot and a fourth slot are controlled by respective independent reset signals.

4. The computing device of claim 1, wherein the first device comprises a thunderbolt device and the second device comprises a non-thunderbolt device.

5. The computing device of claim 4, wherein the feature comprises a power savings mode.

6. The computing device of claim 1, further comprising:
a basic input/output system (BIOS), wherein the processor is to control the BIOS to disable the feature during a boot-up of the computing device.

7. A method, comprising:
identifying, by a processor of a computing device, a first device with a power savings mode in a first slot of an expansion interface;
identifying, by the processor, a second device without the power savings mode in a second slot of the expansion interface;
determining, by the processor, that the first device is compatible with a reset signal that controls the power savings mode and that the second device is not compatible with the reset signal that controls the power savings mode; and
disabling, by the processor, a power savings mode of the expansion interface in response to detecting the first device with the power savings mode in the first slot and the second device without the power savings mode in the second slot by preventing generation of the reset signal that controls the power savings mode.

8. The method of claim 7, wherein the first device comprises a thunderbolt device.

9. The method of claim 7, wherein the second device comprises at least one of a graphics card or a network interface card.

10. The method of claim 7, wherein the expansion interface comprises a peripheral component interconnect express (PCIe) interface.

11. The method of claim 7, wherein the reset signal is shared by the first slot and the second slot of the expansion interface.

12. The method of claim 7, wherein the identifying the first device and the identifying the second device are performed when the computing device is powered on.

13. The method of claim 12, wherein the identifying the first device and the identifying the second device are performed by a basic input/output system (BIOS) during a boot sequence of the computing device.

14. The method of claim 7, wherein the disabling prevents the expansion interface from transmitting the reset signal to the first slot and the second slot in response to the first device entering the power savings mode.

15. The method of claim 7, further comprising:

restarting, by the processor, the computing device;

identifying, by the processor, the first device with the power savings mode in the first slot of the expansion interface;

detecting, by the processor, that the second slot is empty; and enabling, by the processor, the power savings mode of the expansion interface in response to detecting that the second slot is empty.

16. A non-transitory computer readable storage medium encoded with instructions which, when executed, cause a processor of a computing device to:

scan a pair of slots of an expansion interface that share a single reset signal;

detect a first device with a feature compatible with the single reset signal in a first slot of the pair of slots and a second device that does not include the feature in a second slot of the pair of slots;

determine that the first device has the feature compatible with the single reset signal and that the second device does not have the feature compatible with the single reset signal; and disable the feature by preventing generation of the single reset signal.

17. The non-transitory computer readable storage medium of claim 16, wherein the feature comprises a runtime D3 (RTD3) power savings mode.

18. The non-transitory computer readable storage medium of claim 16, wherein the instructions to disable are performed during a boot sequence of the computing device.

19. The non-transitory computer readable storage medium of claim 18, wherein the instructions to disable include instructions to execute a basic input/output system (BIOS) to disable the feature during the boot sequence.

20. The non-transitory computer readable storage medium of claim 16, wherein the instructions to disable the feature are to prevent the expansion interface from generating the single reset signal in response to the first device activating the feature.

* * * * *